(12) United States Patent
Pfeffer et al.

(10) Patent No.: US 9,216,915 B2
(45) Date of Patent: Dec. 22, 2015

(54) INVERSE FLUIDIZATION FOR PURIFYING FLUID STREAMS

(71) Applicant: New Jersey Institute of Technology, Newark, NJ (US)

(72) Inventors: Robert Pfeffer, Scottsdale, AZ (US); Jose Quevedo, Monroe Township, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 141 days.

(21) Appl. No.: 13/852,220

(22) Filed: Mar. 28, 2013

(65) Prior Publication Data

US 2013/0220926 A1    Aug. 29, 2013

Related U.S. Application Data

(60) Division of application No. 12/437,349, filed on May 7, 2009, now abandoned, which is a continuation of application No. PCT/US2007/084070, filed on Nov. 8, 2007.

(60) Provisional application No. 60/865,259, filed on Nov. 10, 2006.

(51) Int. Cl.
*C02F 1/24* (2006.01)
*C02F 9/00* (2006.01)
(Continued)

(52) U.S. Cl.
CPC . *C02F 1/24* (2013.01); *B01D 15/02* (2013.01); *B01J 20/2808* (2013.01); *B01J 20/28047* (2013.01); *C02F 1/281* (2013.01); *C02F 9/00* (2013.01); *C02F 2101/30* (2013.01); *C02F 2101/32* (2013.01)

(58) Field of Classification Search
CPC   B01D 15/02; B01J 20/28047; B01J 20/2808; C02F 9/00; C02F 1/24; C02F 1/281; C02F 2101/30; C02F 2101/32
USPC ................................. 210/661, 689, 690, 691
See application file for complete search history.

(56) References Cited

U.S. PATENT DOCUMENTS

| 3,775,344 | A | 11/1973 | Amagi et al. |
| 5,866,006 | A | 2/1999 | Lihme et al. |

(Continued)

FOREIGN PATENT DOCUMENTS

| EP | 0025309 A1 | 3/1981 |
| WO | 9939816 A1 | 8/1999 |

OTHER PUBLICATIONS

Joseph Celenza, Industrial Waste Treatment Process Engineering, vol. III Specialized Treatment Systems, Jan. 2000,Technomic Publishing Co., p. 69.*

(Continued)

*Primary Examiner* — Matthew O Savage

(57) ABSTRACT

A method for removing a contaminant from a fluid system comprises contacting the fluid system with an inversely fluidized material, for example a particulate aerogel, thereby removing at least a portion of the contaminant from the fluid system. The method can be used to remove oil or other organic materials from wastewater streams. It can be conducted in a fluidized bed, which includes nanoporous particles and a fluidizing medium, wherein the nanoporous particles have a density lower than that of the fluidizing medium.

22 Claims, 16 Drawing Sheets

(51) Int. Cl.

| | |
|---|---|
| *B01D 15/02* | (2006.01) |
| *B01J 20/28* | (2006.01) |
| *C02F 1/28* | (2006.01) |
| *C02F 101/30* | (2006.01) |
| *C02F 101/32* | (2006.01) |

(56) References Cited

U.S. PATENT DOCUMENTS

| | | | |
|---|---|---|---|
| 6,709,600 B2 | 3/2004 | Hrubesh et al. | |
| 7,645,327 B2 | 1/2010 | Pfeffer et al. | |
| 2001/0034375 A1 | 10/2001 | Schwertfeger et al. | |
| 2002/0162798 A1 | 11/2002 | Johnson et al. | |
| 2002/0185444 A1 | 12/2002 | Coronado et al. | |
| 2004/0171700 A1 | 9/2004 | Coronado et al. | |

OTHER PUBLICATIONS

Alsaigh, R., et al., "Evaluation of On-Line Media Filters in the Rouge River Watershed," Rouge River National Wet Weather Demonstration Project, 1999, Nonpoint Work Plan No. URBSW5, Task No. 3.
Cambiella, A., et al., "Treatment of Oil-In-Water emulsions: Performance of a Sawdust Bed Filter," J. Hazardous Materials, Apr. 2006, pp. 195-199, vol. 131, No. 1-3, Elsevier.
Gaaseidnes, K., et al., "Separation of Oil and Water in Oil Spill Recovery Operations," Pure Appl. Chem., 1999, pp. 95-101, vol. 71, No. 1, IUPAC, Great Britain.
Goldsmith, R.L., et al., "Ultrafiltration Concept for Separating Oil from Water," Jan. 1973, U.S. Coast Guard, Washington, D.C. Abstract only.
Hrubesh, L.W., et al., "Solvent removal from water with hydrophobic aerogels," Journal of Non-Crystalline Solids, Jun. 2001, pp. 328-332, vol. 285, No. 1-3, Elsevier.
Hunt, A., et al., "Silica Aerogels," (http://eetd.lbl.gov/ecs/aerogels/sa-home.html), Lawrence Berkeley National Laboratory, Last Updated Apr. 2004. Accessed Nov. 14, 2011.
Johnson, R.F., et al., "Removal of Oil from Water Surfaces by Sorption on Unstructured Fibers," Environmental Science and Technology, 1973, pp. 439-443, vol. 7, No. 5, American Chemical Society.
Manning, F.S., et al., "Environmental Assessment Data Base for Petroleum Refining Wastewaters and Residuals," NTIS, 1983, pp. 94-101, U.S Department of Commerce, Washington D.C.
Mathavan, G.N., et al., "Use of Peat in the Treatment of Oily Waters," Water, Air, Soil Pollut., 1989, pp. 17-26, vol. 45, Kluwer Academic Publishers, the Netherlands.
Mysore, D., et al., "Vermiculite Filtration for Removal of Oil from Water," Practice Periodical of Hazardous, Toxic, and Radioactive Waste Management, Jul. 2006, pp. 156-161, vol. 10, No. 3, American Society of Civil Engineers.
Mysore, D. et al., "Treatment of oily waters using vermiculite," Water Research, Elsevier Ltd., vol. 39, 2005, pp. 2643-2653.
Pasila, A., "A Biological Oil Adsorption Filter," Marine Pollution Bulletin, Dec. 2004, pp. 1006-1012, vol. 49, No. 11-12, Elsevier.
Patterson, J.W., "Industrial Wastewater Treatment Technology," 1985, 2nd. Edition, Butterworth Publishers, Inc., Stoneham, MA. Abstract only.
Quemeneur, M., et al., "Fatty Acids and Sterols in Domestic Wastewaters," Water Research, May 1994, pp. 1217-1226, vol. 28, No. 5, Elsevier.
Quevedo, J.A., et al., "Removal of Oil from Water by Inverse Fluidization of Aerogels," Ind. Eng. Chem. Res., 2009, pp. 191-201, vol. 48, No. 1, American Chemical Society.
"Silica AeroGels," Environmental Energy Technologies Division, Lawrence Berkeley National Laboratory, 2012, Accessed Feb. 20, 2012, (http://eetd.lbl.gov/ECS/aerogels/), 25 pages.
Reynolds, J.G., et al., "Hydrophobic Aerogels for Oil-Spill Cleanup—Intrinsic Absorbing Properties," Energy Sources, 2001, pp. 831-843, vol. 23, No. 9, Taylor & Francis.
Rhee, C., et al., "Removal of oil and grease in oil processing wastewaters," Los Angeles County Sanitation Districts, 1987.
Ribeiro, T.H., et al., "A Dried Hydrophobic Aquaphyte as an Oil Filter for Oil/Water Emulsions," Spill Science & Technology Bulletin, 2003, pp. 483-489, vol. 8, No. 5-6, Pergamon, Great Britain.
Smirnova, I., et al., "Adsorption of Drugs on Silica Aerogels," Langmuir, 2003, pp. 8521-8525, vol. 19, No. 20, American Chemical Society.
Standeker, S., et al., "Adsorption of toxic organic compounds from water with hydrophobic silica aerogels," Journal of Colloid and Interface Science, Jun. 15, 2007, pp. 362-368, vol. 310, No. 2, Elsevier.
Stenstrom, M.K., et al., "Oil and Grease Removal by Floating Sorbent in a CDS Device," CDS Technologies, 1998.
Wang, D., et al., "Aqueous phase adsorption of toluene in a packed and fluidized bed of hydrophobic aerogels," Chemical Engineering Journal, Apr. 15, 2011, pp. 1201-1208, vol. 168, No. 3, Elsevier.
Wang, D., et al., "Removal of emulsified oil from water by inverse fluidization of hydrophobic aerogels," Powder Technology, Nov. 10, 2010, pp. 298-309, vol. 203, No. 2, Elsevier.
"Data Sheet GAS-4105g: AquaSep Plus L/L Coalescer System Effectively Separates Water from Petroleum Products Chemicals," 2001, Pall Corporation, New York, U.S.
"Lantec Products Case Study 51: Oil-Water Separator with New Coalescing Media Handles High Load Stormwater at HydroElectric Powerplant to Yield Zero Oil Discharge," (http://www.lantecp.com/casestudy/cs51.pdf) Lantec Products, Inc., Accessed Nov. 10, 2010.
"Lawrence Livermore National Laboratory Seeks Partnerships with Industry to Commercialize a Material and Method for Removing Aqueous Phase Metals," (https://www.fbo.gov/indexs=opportunity&mode=form&id=56e524e197713746b809f2979f0fd031&tab=core&_cview=0) Accessed Nov. 16, 2011.
"Manual on Disposal of Refinery Wastes," American Petroleum Institute, 1969, Chapter 5, pp. 5-15. Bibliographic information only. Summary provided in Reference No. 24.
"OilSorb," (http://www.biomininc.com/products/oilsorb/), Biomin Inc., Accessed Nov. 10, 2010.
"Retrofitted Oil Water Separators—API Retrofit," (http://www.oil-water-separators.com/oil-water-separators/Retrofitted-oil-water-separators/API/) Mercer International Inc., Accessed Nov. 15, 2011.
"Sorbent Materials in Storm Water Applications," (http://epa/owm/mtb/mtbfact.htm), EPA U.S., Accessed Jul. 2006.
International Search Report mailed May 14, 2008, from International Application No. PCT/US2007/084070, filed on Nov. 8, 2007.
International Preliminary Report on Patentability mailed May 22, 2009, from counterpart International Application No. PCT/US2007/084070, filed on Nov. 8, 2007.

\* cited by examiner

INVERSE FLUIDIZATION FOR PURIFYING FLUID STREAMS

RELATED APPLICATIONS

This application is a Divisional of U.S. patent application Ser. No. 12/437,349, filed on May 7, 2009, which is a Continuation of International Application Number PCT/US20071084070, filed on Nov. 8, 2007, designating the United States, which claims the benefit under 35 USC 119(e) of U.S. Provisional Application No. 60/865,259, filed on Nov. 10, 2006. All these applications are incorporated herein by reference in their entirety.

BACKGROUND OF THE INVENTION

Existing methods for oil removal are based on techniques such as filtration, gravity separation, biological treatment methods, and induced floatation. Other approaches include API (American Petroleum Institute) separators, developed for handling refinery wastewaters, dissolved air flotation oil-water separators, induced air flotation oil-water separators, carbon adsorption and ultrafiltration treatments.

One existing technique employs a coalescing medium, such as, for instance, that supplied by Lantec Products (www.lantecp.com) under the name of HD Q-PAC. In a specific application for removing oil from storm water in a power plant, a unit using HD Q-PAC material was designed to handle 1900 gallons per minute (gpm) of water with an oil concentration of 4250 milligrams/liter (mg/l).

A coalescing system is also supplied by Pall Corporation of East Hills, N.Y. under the name of AquaSep® Plus. In the Pall AquaSep Plus Liquid/Liquid Separation System with Coalescer in a Horizontal Housing, illustrated in FIG. 2 of Pall Corporation Data Sheet GAS-4105g, available at www.pall.com, coalescer elements are stacked horizontally on top of a separator element. The purpose is to ensure equally distributed flow through the separators. After the separator elements, a settling zone is provided for the separation of the two liquid phases. The pressure drop through this system is 2 pounds per square inch differential psid) when new and it has to be replaced when the pressure drop reaches 15 psid.

Many water treatment methods, such as, for instance, reverse osmosis or ultrafiltration require pre-treatment of the contaminated water, adding to overall wastewater treatment costs.

While filtration generally provides good oil removal, capacity and energy consumption have to be considered when designing filtration systems. Since filter media have a given permeability, determining the resistance of the medium for contaminated water flowing through it, this property, commonly monitored by the pressure drop across the filter material, generally increases as the filter becomes saturated with contaminants. As a result, either the amount of water passing through the filter has to be reduced or the pumping power has to be increased leading to a reduction in efficiency from an energy standpoint.

The most commonly used material for removing organic compounds from liquids and gases is activated carbon. Activated carbon is highly porous and thus provides large internal surfaces for adsorbed molecules to reside. However, purification methods based on adsorption by activated carbon as well as other purification techniques such as reverse osmosis and ultrafiltration strongly depend on temperature and their removal capacities and/or efficiencies may be affected under operating temperatures higher than ambient.

Organoclays such as bentonite modified with quaternary amine cations, also can be used to remove oil from water and they are particularly suitable for removal of large organic molecules of low solubility. One of these clay-based products is sold by Biomin (www.biomininc.com) under the name of OilSorbrm. In many cases, a packed bed of organoclay granules is used before the activated carbon to improve its adsorption efficiency, since activated carbon can quickly be blinded by oils that clog its porous surface.

U.S. Pat. No. 6,709,600 B2 issued to Hrubesh et al. on Mar. 23, 2004, the teachings of which are incorporated herein by reference in their entirety, discloses adsorption capacity of hydrophobic silica, aerogel for toluene, cyclohexane, trichloroethylene and ethanol from aqueous solutions.

SUMMARY OF THE INVENTION

A need continues to exist, therefore, for methods and devices effective in removing oil or other organic materials from water and the invention generally relates to a method and apparatus for purifying a fluid phase system such as a wastewater stream.

In one embodiment, the invention is directed to a method for removing a contaminant, e.g., an oil, from a fluid system. The method comprises contacting the fluid system with an inversely fluidized material, thereby removing at least a portion of the contaminant from the fluid system. In specific aspects, the inversely fluidized material is a porous material, preferably a nanoporous material, e.g., aerogel particles. In other aspects, the inversely fluidized material is hydrophobic.

In another embodiment, the invention is directed to a method for purifying a fluid system. The method comprises directing the fluid system to an inverse fluidized bed which includes a material, e.g., a porous material such as aerogel particles, having a density lower than the density of the fluid system: and contacting the fluid system with the material, thereby removing contaminants from the fluid phase system to obtain a purified fluid.

In yet another embodiment, the invention is directed to a method for removing an oil from an aqueous system. The method includes contacting the aqueous system with an inversely fluidized hydrophobic material, thereby removing at least a portion of the oil from the aqueous system.

In a further embodiment, the invention is directed to a fluidized bed which includes nanoporous particles and a fluidizing medium, wherein the nanoporous particles have a density that is lower than that of the fluidizing medium.

The invention is useful in purifying waste or other fluid streams such as discharged or recycled in refineries, manufacturing or processing facility, and in many other instances. The inverse fluidization method and apparatus disclosed herein are flexible and can remove contaminants in a broad size of droplets, for instance they can remove droplets larger than 5 microns. Thus practicing the invention can replace or can be used in conjunction with a system such as the AquaSep Plus Liquid/Liquid Separation System with Coalescer in a Horizontal Housing discussed above and/or one or more techniques illustrated, for instance, in FIG. 1.

The inverse fluidization described herein shows high removal efficiency, low and constant pressure drop (when operating above the minimum fluidization velocity), good mixing between solid particles and the liquid phase, high capacity, and an adjustable voidage in the fluidized bed obtained by changing the velocity of the fluid thus changing the void fraction due to bed expansion.

From an economic standpoint, low pressure drops result in energy costs that are more advantageous than those associated with packed bed filters. Furthermore, in comparison to packed bed filters which operate batch-wise, the inverse fluidization apparatus and method of the invention can be operated in a continuous mode, with contaminant-saturated particles being collected downstream the column and fresh particles being added at the top, or anywhere else along the fluidization column. Beds of the invention can provide more homogeneity in removal of contaminants such as oils than is seen with many packed bed arrangements where the flow often is not well distributed throughout the bed. The downward flow arrangement of inverse fluidization columns described herein promotes coalescence of the droplets of an immiscible contaminant such as oil, favoring higher removal efficiency.

The use of materials having high hydrophobicity, high porosity, and large surface area, such as hydrophobic silica aerogels, is particularly well suited for the removal of immiscible organic compounds, e.g., oils, from water. Combining the properties of these materials with the advantageous properties of inverse fluidization can result in large capacity and high removal efficiency, e.g. as high as 99.9%, depending on the operating conditions. Oil-contaminated streams can be purified to levels of 1 part per million (PRM) or lower.

While water purification methods such as reverse osmosis or ultrafiltration require pre-treatment of the contaminated water inverse fluidized beds of the invention tend to be more robust, requiring little if any pretreatment, thereby reducing overall costs.

Furthermore, while removal efficiencies and capacities of reverse, osmosis, ultrafiltration and adsorption using activated carbon are affected by high temperature conditions, some of the inverse fluidization methods and beds disclosed herein can have removal efficiency independent of changes in temperature of the contaminated water (except for changes in contaminant concentration due to equilibrium considerations between the contaminant and the water at different temperatures).

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale, emphasis has instead been placed upon illustrating the principles of the invention. Of the drawings.

DETAILED DESCRIPTION OF THE PREFERRED EMBODIMENTS

Figure 1:
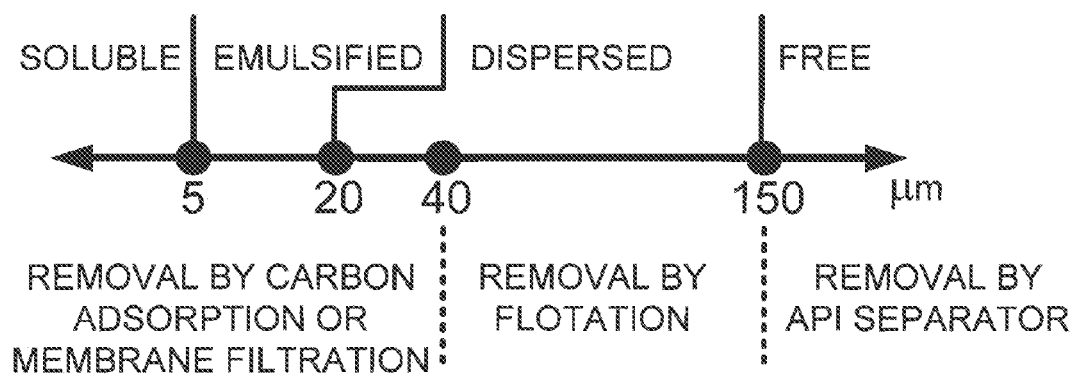
FIG. 1 is a schematic representation of droplet size classification and conventional methods that can be used to remove them.

The invention generally relates to removing, contaminants present in a fluid system and can be tamed out for health or safety reasons, to meet environmental requirements, to clean recyclable or discharged streams in refineries, industrial or commercial applications, or for other reasons.

The term "fluid" generally refers to liquids, gases, including vapors, supercritical fluids, viscous fluids and so forth. As further described below, specific examples of fluid systems that can be purified by practicing the invention include liquid systems and supercritical fluid systems. In preferred aspects, the system is an aqueous waste stream. Non-aqueous systems including carriers such as organic media, e.g., organic solvents, supercritical carbon dioxide and many others also can be purified.

In addition to the fluid carrier, the system includes a contaminant. As used herein, the term "contaminant" refers to a material, e.g., an impurity, or combination of materials not desired in the fluid system. In specific aspects of the invention, the contaminant is a liquid. Examples include organic materials e.g., oils, such as vegetable oil, animal oil, motor oil, crude oil, synthetic oil, and other organic compounds, e.g., hydrocarbons, such as reagents or solvents, e.g., cyclohexane, toluene, benzene, ethanol, trichloroethylene, and so forth.

The liquid contaminant can be miscible or immiscible in the carrier. For instance, one or more water-miscible organic compound(s) can be removed from an aqueous system. In other examples, an aqueous system can include a water-immiscible hydrocarbon.

Solid contaminants, e.g., metals, contaminants such as inorganic materials, biological compounds, organometallics and so forth also could be removed by practicing implementations of the invention.

More than one type of contaminant can be removed. For instance, a contaminant that includes a solvent, e.g., cyclohexane, toluene, benzene, ethanol, trichloroethylene, in combination with an oil can be removed from an aqueous system.

The particle, e.g., droplet, size of the contaminant, depends on the application. It can be, for example, in the range of from about 1 micrometers (microns or μm) to about 150 microns or as large as several millimeters. In some embodiments, the contaminant has a particle size, in the range of from about 1 to about 10000 microns, preferably in the range of from about 5 to about 150 microns.

To remove a contaminant, the fluid phase system is contacted with an inversely fluidized material. Preferably, the material is porous, e.g., microporous or nanoporous and in particulate form. As used herein, the term "microporous" refers to materials having pores that are about 1 micron and larger: the term "nanoporous" refers to materials having pores that are smaller than about 1 micron, preferably less than about 0.1 microns. Pore size can be determined by methods known in the art, such as mercury intrusion porosimetry or microscopy. Preferably the pores are interconnected giving rise to open type porosity.

The porous, e.g., nanoporous material can be an oxide of a metal, such as, for instance, silicon, aluminum, zirconium, titanium, hafnium, vanadium, yttrium and others, and/or mixtures thereof. In some applications, microporous materials also could be utilized.

Materials that are particularly preferred include aerogels and/or xerogels.

Aerogels are low density porous solids that have a gas rather than a liquid as a dispersant. Generally, they are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using an ambient pressure, also referred to as non-supercritical drying process. When applied, for instance, to a silica-based wet gel, surface modification, e.g., end-capping, carried out prior to drying, prevents permanent shrinkage in the dried product. The gel can still shrinks during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume (about 3 milliliter per gram (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 (mW)/m·K at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, of mixtures thereof can be utilized as well.

Also known are organic aerogels, e.g., resorcinol or melamine combined with formaldehyde, dendredic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

In specific aspects of the invention, the material, e.g., aerogel, employed is hydrophobic. As used herein, the terms "hydrophobic" and "hydrophobized" refer to partially as well as to completely hydrophobized aerogel. The hydrophobicity of a partially hydrophobized material such as aerogel can be further increased. In completely hydrophobized materials, e.g., aerogels a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found in U.S. Pat. No. 6,709,600 B2 issued to Hrubesh et al. on Mar. 23, 2004, the teachings of which are incorporated herein by reference in their entirety.

Hydrophobic materials such as hydrophobic aerogels can be produced by using hydrophohizing agents, e.g., silylating agents, halogen- and in particular fluorine-containing compounds such as fluorine-containing alkoxysilanes or alkoxysiloxanes, e.g., trifluoropropyltrimethoxysilane (TFPT-MOS) and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane phenylethyldiethoxysilane, triinethylalkoxysilanes e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl) propyl}tetrasulfide, hexamethyldisilazane and combinations thereof.

The porous material can include one or more additives, such as fibers, opacifiers, color pigments, dyes and mixtures thereof. For instance, a nanoporous material which is a silica aerogel can contain additives such fibers and/or one or more metals or compounds thereof. Specific examples include aluminum, tin, titanium, zirconium or other non-siliceous metals, and oxides thereof. Non-limiting examples of suitable opacifiers include carbon black, titanium dioxide, zirconium silicate, and mixtures thereof. While any appropriate loading of opacifier may be used, preferred loadings for the opacifier are between 1 vol. % and 50 vol. %).

The particulate porous material can be produced in granular, pellet, bead, powder, or other particulate form and in any particle size suitable for an intended application. For instance, the particles can be within the range of from about 0.01 microns to about 10.0 millimeters (mm) and preferably have a mean particle size in the range of 0.3 to 3.0 mm.

Examples of commercially available hydrophobic aerogel materials in particulate form are those supplied under the tradename of Nanogel® by Cabot Corporation, Billerica, Mass. Nanogel® granules have high surface area, are more than about 90% porous and are available in a particle size ranging, for instance, from about 8 microns (μm) to about 10 mm.

Contaminants can be removed using combinations of materials, for instance, combinations of materials such as those disclosed in U.S. Pat. No. 6,709,600 B2 issued to Hrubesh et al, on Mar. 23, 2004, the teachings of which are incorporated herein by reference in their entirety. In a specific example, aerogel granules can be used in conjunction with activated carbon to remove miscible and immiscible hydrocarbons from water.

In one embodiment of the invention, materials described above, and in particular hydrophobic silica aerogel, are used to remove organic compounds from an aqueous system.

Figure 2A:
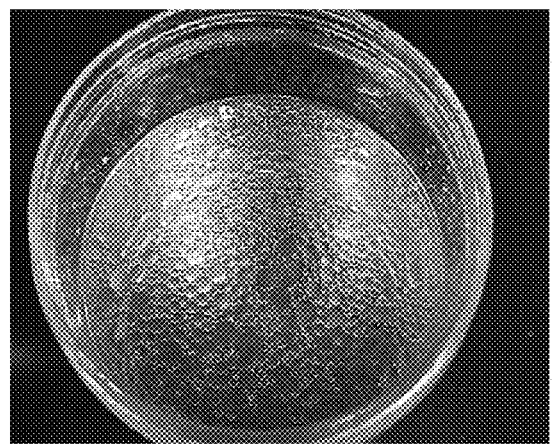
FIG. 2A is a photograph showing oily water before contact with a packed bed of Nanogel® particles.
Figure 2B:
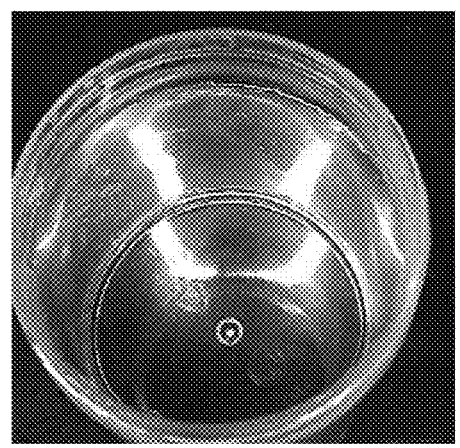
FIG. 2B is a photograph showing purified water after the oily was contacted with the packed bed of Nanogel® particles.

A qualitative assessment regarding the performance Nanogel® particles in purifying an oil-water mixture is shown in the photographs (FIG. 2A and FIG. 2B), where FIG. 2A shows oily water before contact with a packed bed of Nanogel® particles and FIG. 2B shows purified water after the oily water was contacted with the packed bed of Nanogel® particles.

A comparison of the adsorption capacity of an hydrophobic silica aerogel and that of a granulated activated carbon is provided in TABLE 1 of U.S. Pat. No. 6,709,600 B2 issued to Hrubesh et al. on Mar. 23, 2004, the teachings of which are incorporated herein by reference in their entirety.

Aerogel and/or other materials that have a density lower than that of the fluid phase system being purified can remove contaminants by inverse fluidization, a process in which solid particles are dispersed in a fluid, when the density of the particulate material is less than the density of the fluid.

Preferably, the difference between the density of the fluidizing fluid, e.g., a wastewater stream being purified, and the solid material employed to effect the purification is at least about 0.1 g/cm³. For a water-based system, the solid material used preferably has a density that is less than about 0.8 g/cm³, more preferably a density that is less than about 0.1 g/cm³. In specific examples, the material has a density within the range of from about 0.01 to about 0.8 g/cm³.

Figure 3:
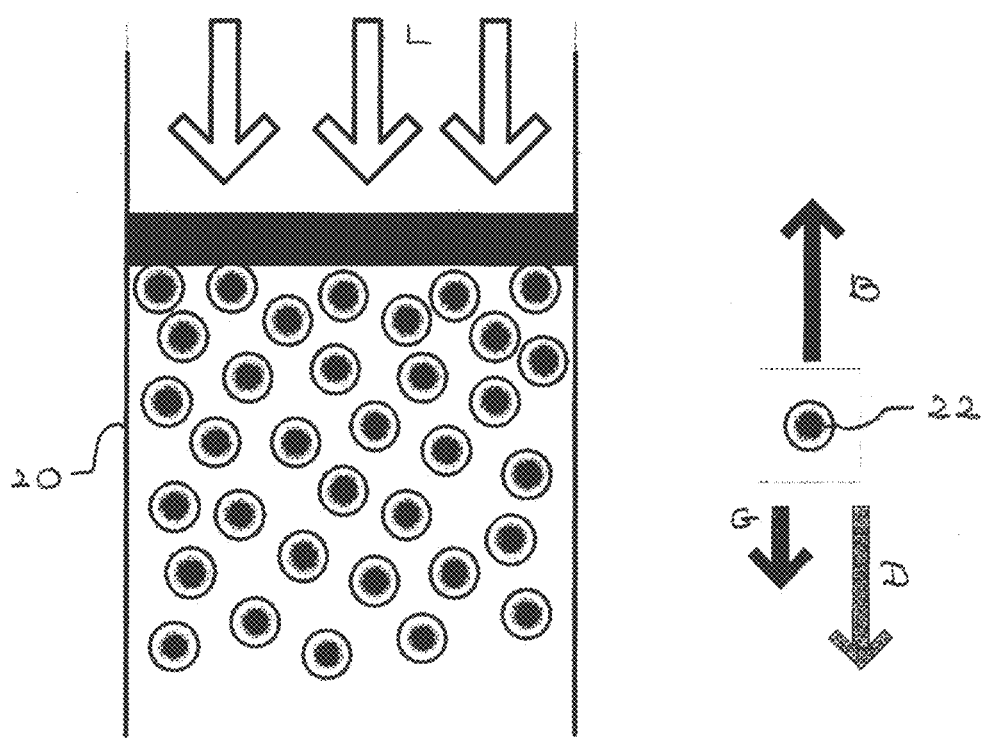
FIG. 3 is a schematic diagram of inverse fluidization.

Shown in FIG. 3 is a schematic diagram of liquid solid inverse fluidization. As seen in FIG. 3, the liquid flow, represented by arrows L is in the direction of gravity, downwards, and the bed expands from the top of the column 20 towards the bottom. Full fluidization of the bed is reached when there is a balance between the forces acting on the particles, e.g., particle 22, specifically: drag (arrow D), gravity (arrow G), and buoyancy (arrow B), forces at the minimum fluidization velocity.

Particles fluidize when buoyant force is overcome by the forces of drag and gravity, as shown in the equations below:

Buoyancy force: $F_B=(\rho_l-\rho_p)V_p g$ ($\rho$, density; $V_p$, volume of granule; $g$, gravity acceleration; subscripts: $l$=liquid, $p$=granule)

Gravity force: $F_g=\rho_p V_p g$

Drag force:

$$F_D = \frac{1}{2}C_D\rho_g U_{mf}^2 \left(\frac{\pi}{4}\right)d_p^2$$

($U_{mf}$, minimum fluidization velocity; $C_d$, drag coefficient; $d_p$, granule diameter).

Inverse fluidization can be conducted in a housing, e.g., column, which can be constructed from a suitable material such as a plastic material, e.g., acrylic, glass, metal, e.g., aluminum steel, or from another suitable material. In one example, a fluidization bed includes nanoporous material having a density lower than that of the fluidizing medium.

Figure 14:
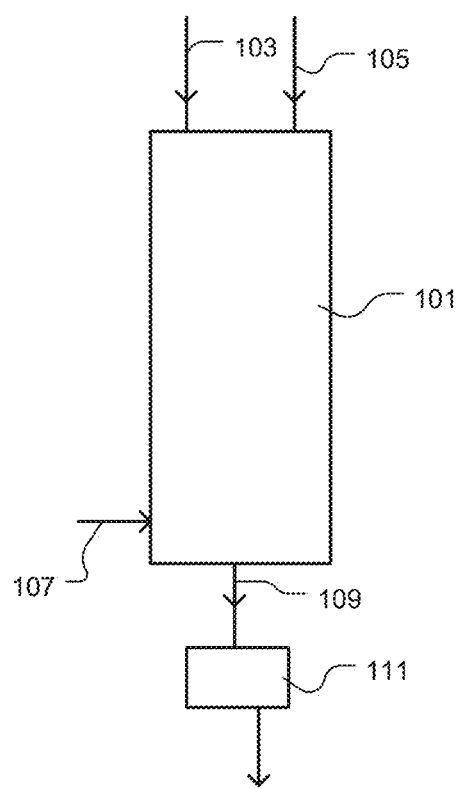
FIG. 14 is a schematic diagram of an arrangement used to conduct an embodiment of the invention.

In preferred embodiments, the inverse fluidization apparatus of the invention is configured for continuous operation. Since with time solid, e.g. aerogel, particles saturated with contaminant become heavy, they can be collected downstream of the fluidized bed system. Fresh particles can be added at the top or anywhere else along the fluidization column. Shown in FIG. 14 is inverse fluidization column 101, receiving contaminated liquid 103. Fresh nanoporous oxide material can be added as feed 105 at the top of column 101, or anywhere else along the column (shown in this drawing as feed 107, for example). Contaminant-containing material leaves column 101 (with exiting liquid 109, for example) and is collected, e.g., by filter 111.

In general, the size of granules used in the inverse fluidized beds of the invention can depend on factors such as specific application, height of the fluidized bed and so forth. For instance, if a design requires a bed that is relatively short, e.g., a few feet, then a small granule size e.g., less than 1 mm, may be preferred. Larger particle sizes can be used in taller fluidized bed. While small granules provide better removal efficiency they also tend to require operation at low superficial velocities. In a specific example employing aerogel material, the aerogel particle size is greater than 0.5 mm. For instance, the particle size can be, but is not limited to be within the range of from about 0.5 to about 2.3 mm. Larger aerogel particles, e.g., 10 mm, also can be used, for instance in scale-up applications, and/or when using larger fluid velocities. Smaller particle sizes also can be selected.

Inverse fluidization employing a material such an aerogel can be operated at a temperature that allows for the existence of the liquid phase. In case of water, from 32° F. up to close to 212° F., preferably in the range of from about 40° F. to about 150° F.

Practicing aspects of the invention can purify oil bearing waste water streams to a level of 1 PPM or lower.

Inverse fluidization can be used in combination with other purification techniques and/or devices, for example with packed bed filters, regular fluidized beds, coalescing elements, API separators, ultrafiltration systems, reverse osmosis, activated carbon adsorbers and so forth. Systems and processes can be designed to include a bed and/or method such as described herein.

Figure 15:
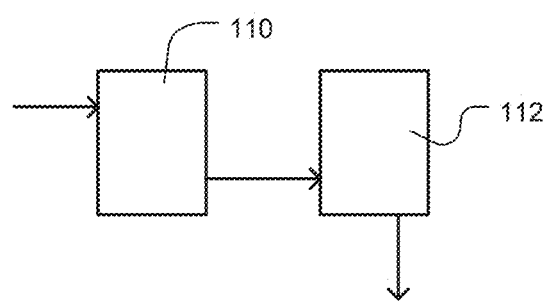
FIG. 15 is a schematic diagram of an arrangement in which inverse fluidization according to aspects of the invention is used in combination with another purification technique.

For instance, in one example, inverse fluidization of aerogel particles is combined with one or more other techniques for purifying fluid streams that contain contaminants having relatively large droplet sizes. In another example, inverse fluidization of aerogel particles is used upstream of an activated carbon filter to remove water-miscible or water-immiscible hydrocarbons from water. In yet another example, a fluid stream, e.g., wastewater, containing solid as well as liquid, e.g., oil, contaminants is purified by removing solid contaminants using a suitable technique, optionally followed by a technique suitable for removal of larger droplets, followed by an inverse fluidization process or apparatus such as described herein for removing remaining droplets, to produce a purified stream. Shown in FIG. 15, for example, is inverse fluidization system 110 according to embodiments of the invention, disposed upstream of activated carbon filter 112.

The invention is further illustrated by the following non-limiting examples.

EXAMPLES

The aerogel employed was Nanogel® obtained from Cabot Corporation, Billerica, Mass. Two of the granule sizes used were: (A) 2.3 mm sieved granules having a particle size range between 1.7 and 2.3 mm; and (B) 500-850 µm, sieved granules. Experiments also were conducted using un-sieved 2.3 mm granules, which included granules in the range of 0.5 up to 2.3 mm. Translucent specifications are labeled herein as TLD and opaque specifications as OGD. Numbers following the TLD and OGD specifications are particle size descriptors.

Figure 4:
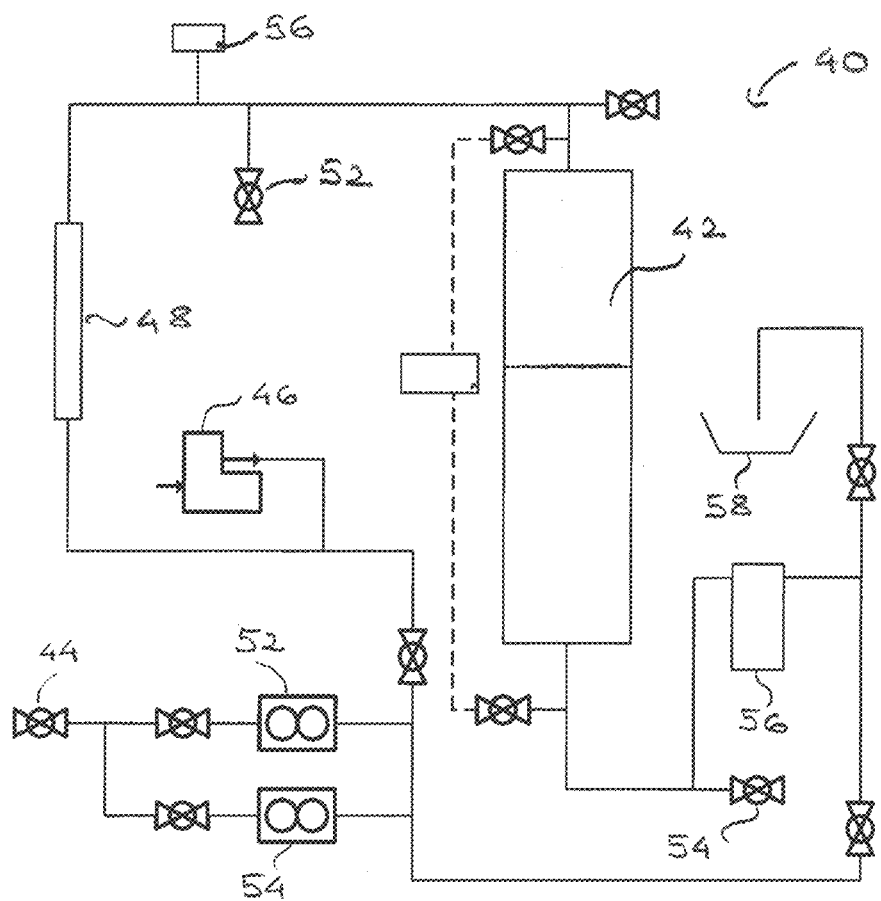
FIG. 4 is a schematic diagram of an arrangement that can be used to conduct the method of the invention.

A schematic diagram of the experimental setup including an inverse fluidization bed, in which, as discussed above, contaminated water flows downwards inside the column, is shown in FIG. 4.

Shown in FIG. 4 is an apparatus 40 including inverse fluidization column 42, water supply 44, metering pump 46, static mixer 48, sampling points 52 and 54, filter 56, drain 58, flow meters 62 and 64 and pressure gauge 66.

During operations, flow meters 62 and 64, one provided for low range flows and the other for larger flows, measured flow of water. Oil, as well as any other immiscible liquid or solution, were added to the water in a controlled manner by metering pump 46. The added oil or solution was mixed with the water by passage through static mixer 48. The pressure in the system was measured at this point (by pressure gauge 56) and was kept constant during the entire experiment, and also for different runs. The pressure drop across the bed was measured by a differential pressure transmitter with a range of 0 to 2 psid.

Generally, a sample of the oil-contaminated water was drawn for analysis, e.g., at sampling point 52, before entering fluidization column 42. A second sample of water was taken after passing through the inverse fluidized bed, e.g., at sampling point 54.

Figure 5:
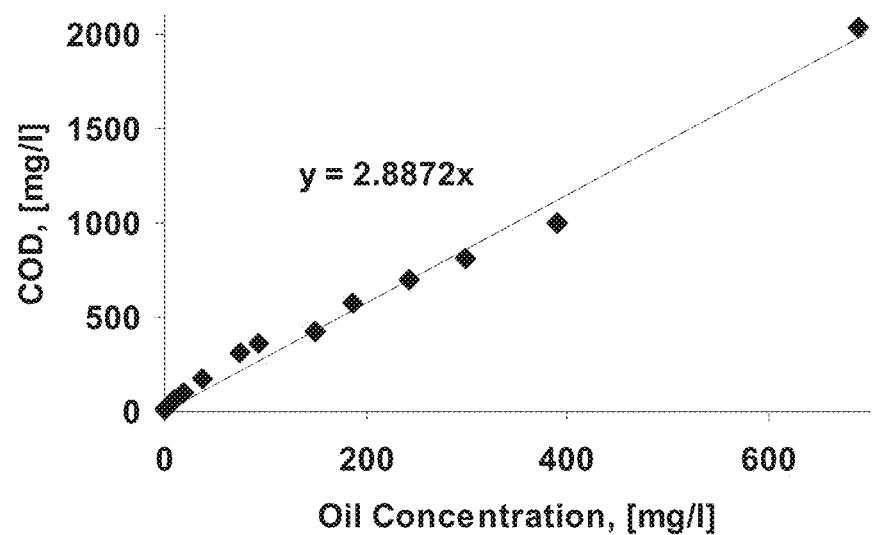
FIG. 5 is a plot showing the relationship between the oil concentration in water and the Chemical Oxygen Demand (COD) as measured by the HACH method with the Colorimeter.

Both samples were analyzed for either oil or hydrocarbon content by using a colorimeter (HACH). For oil analysis, the COD (chemical oxygen demand) method was used since it was found to be strong enough to digest the mixture of immiscible oil and water. The COD is a measured property, which is proportional to the concentration of oil in water as shown in FIG. 5. A HACH test for Chemical Oxygen Demand (COD), developed by Hach Company of Loveland. Colo., can be conducted in about 3 hours.

Example 1

Figure 6A:
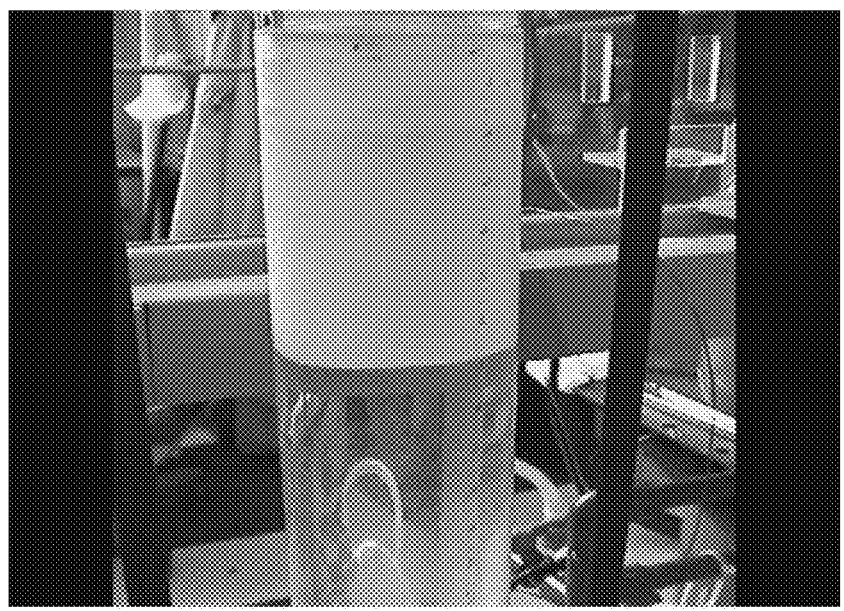
FIG. 6A is a photograph of an inverse fluidized bed of 500-850 microns Nanogel® particles (sieved).
Figure 6B:
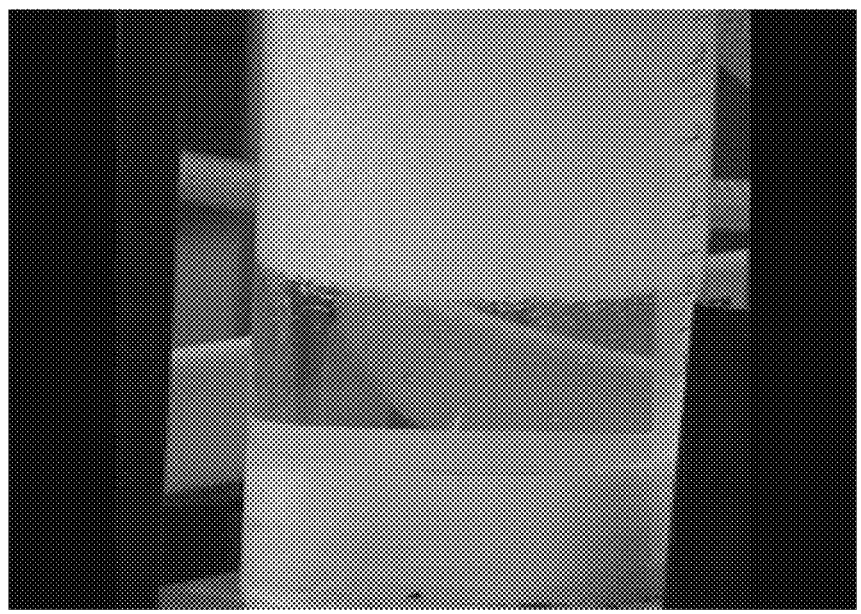
FIG. 6B is a photograph of an inverse fluidized bed of 2.3 mm Nanogel® particles (un-sieved).

Different amounts of granules of Nanogel® were inversely fluidized in order to study inverse fluidization characteristics of this material. FIG. 6A is a photograph of inverse fluidized bed of 500-850 microns Nanogel® particles (sieved). FIG. 6B is a photograph of inverse fluidized bed of 2.3 mm Nanogel® particles (un-sieved).

The inversely fluidized bed pressure drop and bed expansion data were collected as a function of fluid velocity; these data are shown in FIGS. 7A through 7C and 8A through 8C, respectively. The data show typical behavior of liquid-solid fluidized beds characterized by a proportional increase in the bed pressure drop at fluid velocities below minimum fluidization velocity, a pressure drop plateau during frill fluidization, a minimum fluidization velocity dependant on particle size, a pressure drop dependant on the amount of particles and a bed expansion that starts at the minimum fluidization velocity.

Figure 7A:
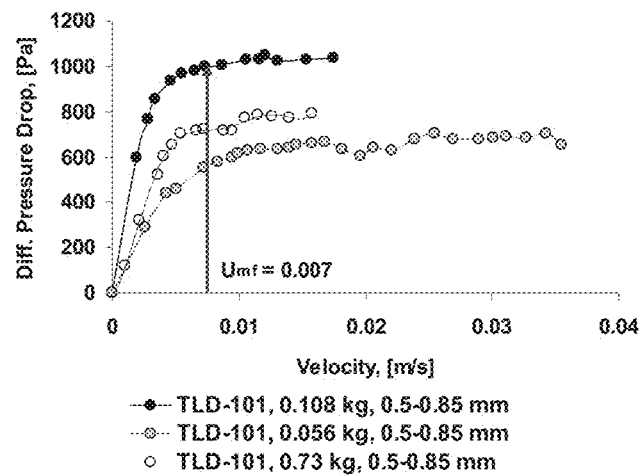
FIG. 7A through 7C are series of plots showing pressure drop across inversely fluidized beds of translucent Nanogel®, particles as a function of fluid velocity.
Figure 7B:
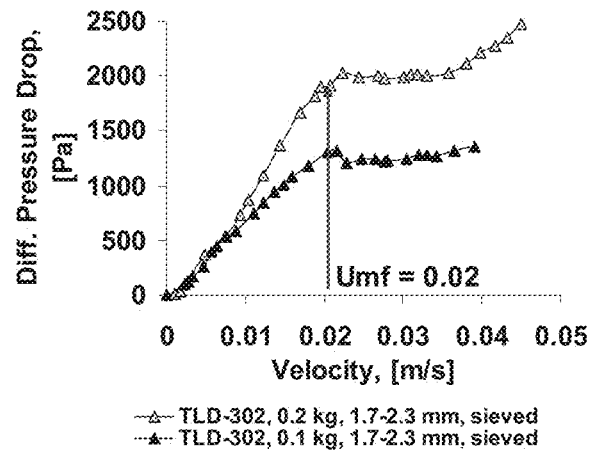
Figure 7C:
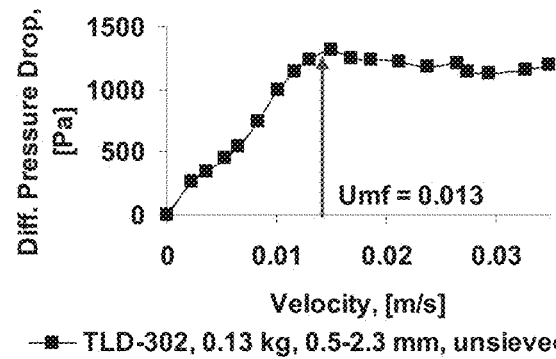

FIGS. 7A, 7B and 7C indicate that the pressure drop will depend on the amount of powder that is inversely fluidized. This behavior is quite different from that typically observed in a packed bed where a large pressure drop is obtained even with a small amount of granules when there is a large liquid flow passing through it For filter beds, a maximum differential pressure drop of 10 psid generally is acceptable during operation a higher pressure drop leads to excessive energy costs.

Figure 8A:
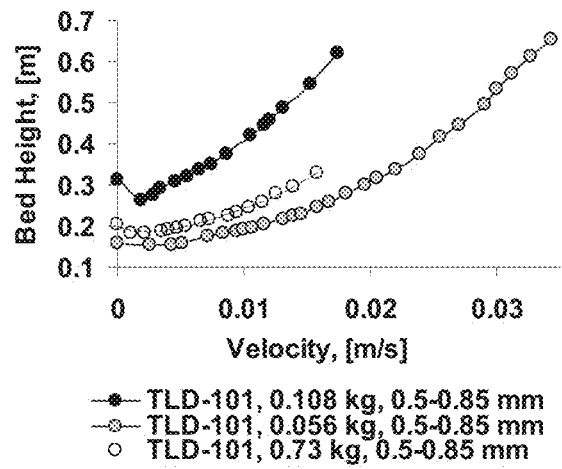
FIG. 8A through 8C are series of plots of bed expansion as a function of fluid velocity.
Figure 8B:
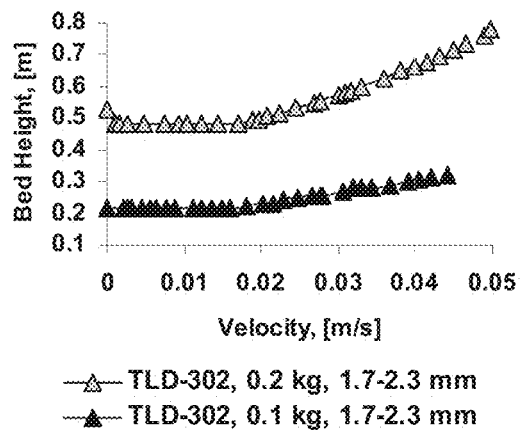
Figure 8C:
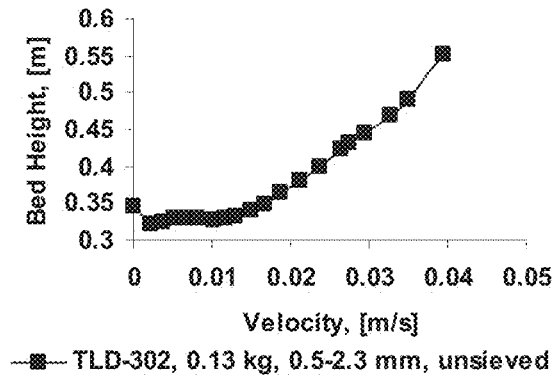

As can be seen in FIGS. 8A, 8B and 8C, the bed starts to expand at full fluidization, which occurs at fluid velocity values larger than the minimum fluidization velocity (shown by the arrows). The increase in bed height means that the void fraction of the fluidized bed, which has strong effects on the contaminant removal rate, is increasing. The voidage of the bed preferably is adjusted in order to expose each individual Nanogel® particle to the contaminant, e.g., oil in the water, but without allowing oil droplets to pass through the fluidized bed, a condition that can occur at high fluid velocities and large values of the void fraction for relatively short beds.

Also, due to the mixing of particles during fluidization, the oil will be adsorbed more homogenously in an inverse fluidized bed than in a packed bed where, in some cases, the flow is not well distributed within the void volume of the bed.

Example 2

Removal of oil from water was studied by injecting oil with a metering pump using an arrangement such as shown in FIG. 4. The oil was mixed with the water by using an in-line static mixer. Water samples, before and after the inverse fluidized bed, were taken for chemical oxygen demand (COD) analysis. COD concentration was found by using the HACH colorimetric method. In these experiments, since oil was added to tap water, the chemical oxygen demand (COD) was roughly proportional to the oil concentration in the water as shown in FIG. 5. Therefore COD levels were used as a reference of oil concentration.

In one case, 56 grams of Nanogel® granules with sizes from 500 to 850 microns were used to adsorb oil from water. The flow velocity was about 1.07 cm/s. The concentration of oil upstream the fluidized bed was about 450 mg of oil/l of water.

Figure 9:
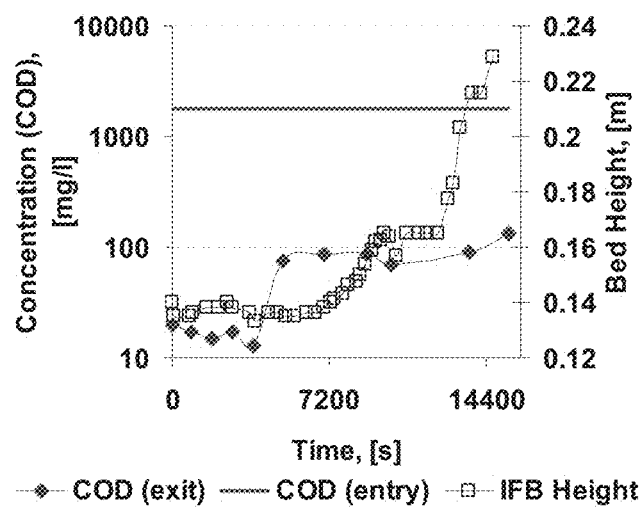
FIG. 9 is a plot of concentration, measured by COD, as a function of time upstream (straight line) and downstream (diamonds) in an inverse fluidized bed of 56 g of Nanogel®. Bed expansion (squares) as a function of time also is shown. The size range of the aerogel granules was between 0.5 to 0.85 mm. The fluid velocity was 0.0107 cm/s. Upstream oil concentration was about 450 mg of oil/1 of water.

As shown in FIG. 9, the inverse fluidized bed of Nanogel® is very effective in removing oil from water. There was at least a one order of magnitude reduction in COD concentration which implies a more than 90% removal rate; other experiments have shown removal efficiencies of 99%, and higher.

The bed height (squares) was also monitored during the removal of oil from water by the inverse fluidized bed as shown in FIG. 9. It can be clearly seen that the bed expands as a consequence of the saturation of some of the Nanogel® granules with oil. Since they become heavier, they tend to move towards the bottom of the column, increasing the bed height of the fluidized bed.

In addition, the adsorption capacity of the Nanogel® was quite large since 56 grams of the material adsorbed 420 grams of oil (as estimated by the injection of oil, 0.105 kg/h, during 4 hours). This means a 7.5 by weight ratio of oil adsorbed with respect to the amount of Nanogel®.

The pressure drop of the inversely fluidized bed was monitored during the removal of oil from water and the maximum pressure drop was about 700 Pa (0.1 psi), which is far below the pressure drop of a packed bed containing a similar amount of granules. As can be seen in FIG. 9, there is a change in slope (inflection point) with time, the pressure drop increases as oil is injected into the fluidizing water but then decreases as Nanogel® granules become heavier reducing their buoyancy and the drag force needed to fluidize them. During the process, granules are also being entrained from the fluidization column reducing the pressure chop even further.

Example 3

In another case, 108 grams of Nanogel® granules with sizes from 500 to 850 microns were used to adsorb oil from water. The flow velocity was about 1.02 cm/s. The concentration of oil upstream the fluidized bed was about 470 mg of oil per kg (liter) of water.

Figure 10:
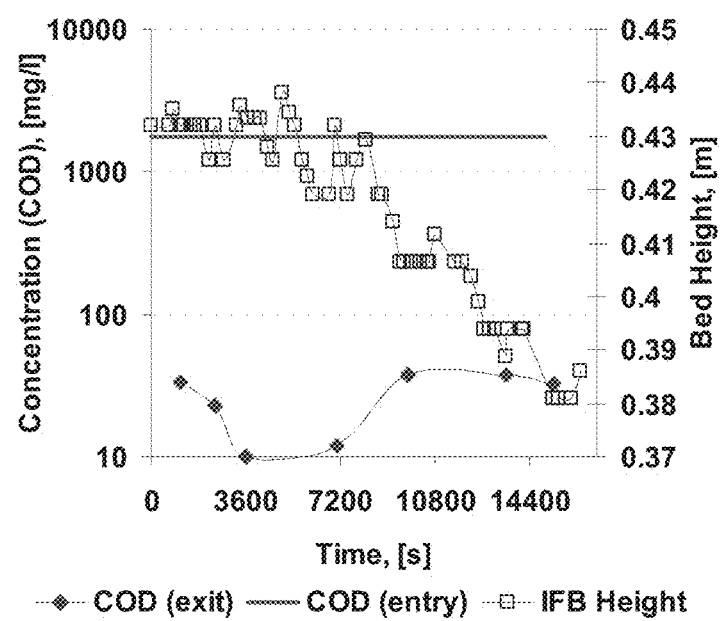
FIG. 10 is a plot of chemical oxygen demand (COD) and inverse fluidized bed expansion (squares) as a function of time of 108 grams of translucent Nanogel® granules with sizes between 0.5 to 0.85 mm during removal of oil from water (0.47 g of oil/kg of water and 0.0102 m/s fluid velocity).

As shown in FIG. 10, the inverse fluidized bed of Nanogel® was very effective on removing oil from water with a reduction in COD concentration from 1400 mg/l down to 40 mg/l, which implies a 97% removal.

The bed height was also monitored during the removal of oil from water by the inverse fluidized bed as also shown in FIG. 10. It can be clearly seen that the bed reduces as a consequence of the saturation of some of the Nanogel® granules with oil. In this case, because of the initial taller height of the fluidized bed (more particles were used thus increasing the initial bed height), there was an oil concentration gradient, with more oil at the top. This gradient makes particles at the top saturate faster than particles at other locations in the fluidized bed. After saturation, these particles become heavier and are entrained by the flow leading to a reduction in the bed expansion. Thus a continuous process can easily be designed by feeding clean granules into the system at the top, while granules saturated with oil leave the column at the bottom.

Example 4

Another set of experiments was performed to find the effect of using different amounts of fluidized granules on the oil removal efficiency; for these experiments the $U/U_{mf}$ ratio was kept at 4.4, where $U_{mf}$ is the minimum fluidization velocity and U the superficial fluid velocity. Adding different amounts of granules to the column will result in different initial fluidized bed heights. The residence time of oil droplets in tall fluidized beds (large amount of granules) is larger when compared to short fluidized beds. Therefore, in short fluidized beds the oil and granules will be more homogeneously mixed much like in a Continuous Stirred Tank Reactor (CSTR). In tall beds granules at the top of the column will be more saturated with oil than granules at other locations in the fluidized bed.

Figure 11:
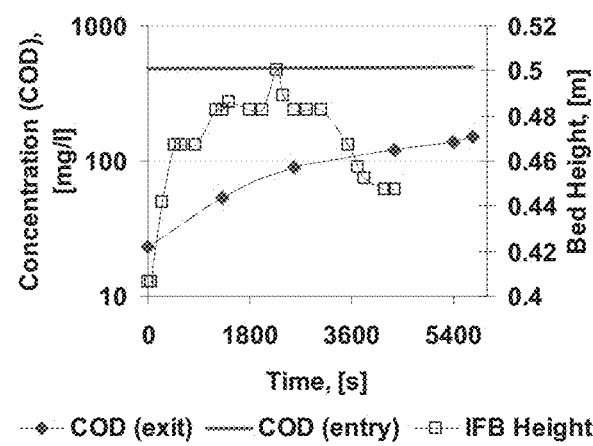
FIG. 11 is a plot of chemical oxygen demand (COD) and inverse fluidized bed expansion (squares) as a function of time of 56 grams of opaque Nanogel® granules with sizes between 0.5 to 0.85 mm during removal of oil from water (0.18 g of oil/kg of water and fluid velocity of 0.0305 m/s).
Figure 12:
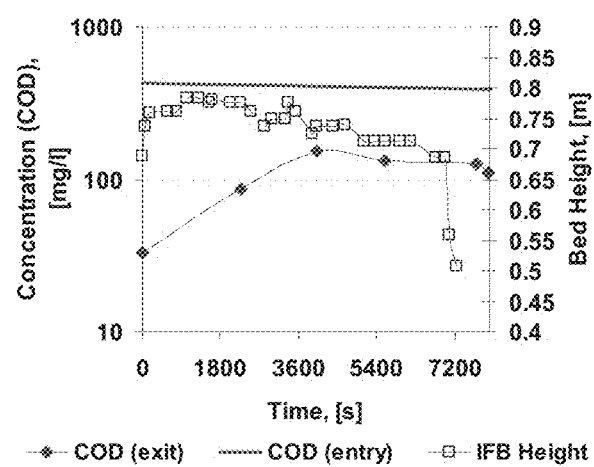
FIG. 12 is a plot of chemical oxygen demand (COD) and inverse fluidized bed expansion (squares) as a function of time of 100 grams of opaque Nanogel® granules with sizes between 0.5 to 0.85 mm during removal of oil from water (0.18 g of oil/kg of water a Id fluid velocity of 0.0305 m/s.

FIG. 11 shows the COD levels and the bed expansion of 56 grams of small aerogel granules. It can be seen that there is a significant bed expansion from 40 to 50 cm, indicating a CSTR-type of mixing where most of the granules saturate simultaneously. FIG. 12 shows COD levels and bed expansion for 100 grams of small aerogel granules exposed to the same concentration of oil and operating conditions as in the experiment using 56 grams described in FIG. 11.

The data indicate that the bed height increases slightly at the beginning of the experiment, but then drops off because of the loss of saturated granules during the adsorption of oil. As expected, the fluidized bed with the smaller amount of granules gets saturated faster as seen by the more rapid changes in bed height with time. It is also important to note that the COD levels at the exit of both fluidized beds are fairly similar even though different amounts of aerogel are used this indicates that the removal efficiency is independent of the height of the bed at relatively high $U/U_{mf}$ ratios e.g., $U/U_{mf}=4.4$).

Figure 13:
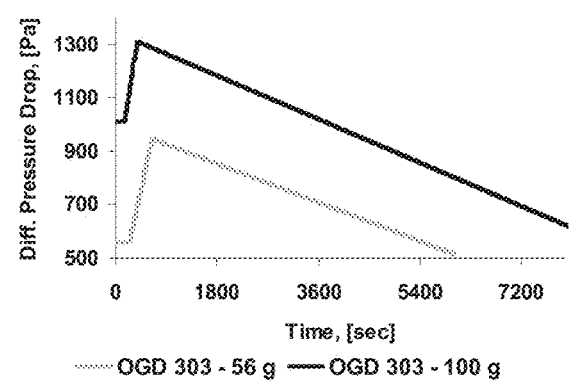
FIG. 13 is plot of pressure drop across the inversely fluidized beds of aerogel during the removal of oil corresponding to FIGS. 11 and 12. Superficial flow velocity was kept constant at 0.0305 m/s.

FIG. 13 shows the differential pressure drop across the inverse fluidized beds described by FIG. 11 and FIG. 12 during oil removal; as expected, the figure shows that the pressure drop is proportional to the amount of fluidized powder in the bed. In both cases, the pressure drop across the bed of granules does not plateau, indicating that the granules did not fully saturate.

Generally, pressure drop observed with inverse fluidized beds described herein is low, e.g., about 0.2 psid, and does not build up with use. Moreover, the initial pressure drop across the fluidized bed of granules is only dependant on the amount of aerogels used, the density of the aerogels and the cross sectional area of the column. As oil is added, the pressure drop increases initially, due to the buoyancy of the oil droplets, then decreases due to the reduction in the buoyancy of the aerogel granules as oil is adsorbed into them increasing their weight. With Nanogel® particles, the bed exhibits very good mixing between the aerogel and a liquid phase system, e.g., aqueous system.

While this invention has been particularly shown and described with references to preferred embodiments thereof, it will be understood by those skilled in the art that various Changes in form and details may be made therein without departing from the scope of the invention encompassed by the appended claims.

What is claimed is:

1. A method for removing a contaminant that is an oil from a fluid system, the method comprising:
    contacting the fluid system with an inversely fluidized nanoporous oxide material, to remove at least a portion of the contaminant from the fluid system, wherein buoyant, drag and gravity forces are exerted on the nanoporous oxide material and wherein contaminant-containing nanoporous oxide material has reduced buoyancy so that the buoyant force is overcome by the forces of drag and gravity, causing the contaminant-containing nanoporous oxide material to move downward; and
    collecting the downward moving, contaminant-containing nanoporous oxide material.

2. The method of claim 1, wherein the fluid system is a liquid system.

3. The method of claim 1, wherein the fluid system is wastewater.

4. The method of claim 1, wherein the nanoporous oxide material is a particulate aerogel material.

5. The method of claim 4, wherein the aerogel has a particles size larger than about 0.5 mm.

6. The method of claim 1, wherein the nanoporous oxide material is hydrophobic.

7. The method of claim 1, wherein the nanoporous oxide material is an oxide of silicon, aluminum, zirconium, titanium, hathium, vanadium, yttrium or any combination thereof.

8. The method of claim 1, wherein the method is configured for continuous operation.

9. A purification process comprising the method of claim 1 in combination with a purification technique conducted in a packed bed filter, regular fluidized bed, coalescing element, API separator, ultrafiltration system, reverse osmosis system, activated carbon adsorber system or any combination thereof.

10. A method for purifying a fluid system, the method comprising:
  a. directing the fluid system to a top of an inverse fluidized bed, wherein the bed includes a nanoporous oxide material having a density lower than the density of the fluid system;
  b. contacting the fluid system with the nanoporous oxide material to remove at least a portion of oil contaminants present in the fluid system and to produce a purified fluid; and
  c. collecting nanoporous oxide material containing oil contaminants at a bottom of the fluidized bed.

11. The method of claim 10, wherein the fluid system is a wastewater stream.

12. The method of claim 10, wherein the nanoporous oxide material is a particulate aerogel.

13. The method of claim 12, wherein the aerogel is a hydrophobic silica aerogel.

14. The method of claim 10, wherein the nanoporous oxide is an oxide of silicon, aluminum, zirconium, titanium, hafnium, vanadium, yttrium or any combination thereof.

15. The method of claim 10, wherein a difference between the density of the fluid system and that of the nanoporous oxide material is at least about 0.1 g/cm$^3$.

16. The method of claim 10, wherein buoyant, drag and gravity forces are exerted on the nanoporous oxide material and wherein the nanoporous oxide material has reduced buoyancy so that the buoyant force is overcome by the forces of drag and gravity.

17. The method of claim 10, further comprising adding fresh nanoporous oxide material to the inverse fluidized bed.

18. The method of claim 10, wherein the method is conducted as a continuous process, with fresh nanoporous oxide material being added while nanoporous oxide material containing oil contaminants leaves the inverse fluidized bed.

19. A purification process wherein the inverse fluidized bed of claim 10 is used in combination with one or more of a packed bed filter, a regular fluidized bed, a coalescing element, an API separator, an ultrafiltration system, a reverse osmosis system, or an activated carbon adsorber system.

20. A method for removing an oil from an aqueous system, the method comprising:
  contacting the aqueous system with an inversely fluidized hydrophobic material, to remove at least a portion of the oil from the aqueous system, wherein buoyant, drag and gravity forces are exerted on the hydrophobic material and wherein oil-containing hydrophobic material has reduced buoyancy so that the buoyant force is overcome by the forces of drag and gravity, causing the oil-containing hydrophobic material to move downward; and
  collecting downward moving, oil-containing hydrophobic material.

21. A purification process comprising the method of claim 20 in combination with a purification technique conducted in a packed bed filter, regular fluidized bed, coalescing element, API separator, ultrafiltration system, reverse osmosis system, activated carbon adsorber system or any combination thereof.

22. The method of claim 20, wherein the method is configured for continuous operation.

* * * * *